(12) United States Patent
Becker et al.

(10) Patent No.: US 8,080,080 B2
(45) Date of Patent: Dec. 20, 2011

(54) MULTI-STAGE APPARATUS FOR SEPARATING LIQUID DROPLETS FROM GASES

(75) Inventors: Stefan Becker, Speyer (DE); Carsten Schippers, Roemerberg (DE); Wolfgang Heikamp, Waldsee (DE); Tobias Neumann, Kuhardt (DE); Andreas Stephan, Speyer (DE); Jens Gutekunst, Dudenhofen (DE); Peter Biebricher, Kreuzau (DE)

(73) Assignee: Mann+Hummel GmbH, Ludwigsburg (DE)

( * ) Notice: Subject to any disclaimer, the term of this patent is extended or adjusted under 35 U.S.C. 154(b) by 925 days.

(21) Appl. No.: 11/783,593

(22) Filed: Apr. 10, 2007

(65) Prior Publication Data

US 2008/0250772 A1    Oct. 16, 2008

(30) Foreign Application Priority Data

Apr. 12, 2006  (DE) .......................... 10 2006 017 635

(51) Int. Cl.
*B01D 59/00*    (2006.01)

(52) U.S. Cl. ................ 55/482; 55/337; 55/320; 55/322; 55/466; 95/268

(58) Field of Classification Search .................... 55/436, 55/447, 471, DIG. 17, 423, 337, 495, 319–322, 55/456–457, 485–487, 466, 482; 95/271, 95/291, 35, 268; 210/703, 706, 712, 787; 60/269; 96/189; 34/80–82
See application file for complete search history.

(56) References Cited

U.S. PATENT DOCUMENTS

| | | | | |
|---|---|---|---|---|
| 4,402,715 A * | 9/1983 | Ruyak et al. | ..................... 55/317 |
| 5,407,584 A * | 4/1995 | Broussard, Sr. | ............... 210/703 |
| 5,713,985 A * | 2/1998 | Hamilton | ........................... 95/90 |
| 6,409,804 B1 * | 6/2002 | Cook et al. | ....................... 95/273 |
| 6,607,572 B2 * | 8/2003 | Gammack et al. | ............... 55/343 |
| 2005/0044827 A1 * | 3/2005 | Eppel et al. | ..................... 55/423 |

* cited by examiner

Primary Examiner — Jason M Greene
Assistant Examiner — Karla Hawkins (57) ABSTRACT

Disclosed is a device for separating liquids from gases comprising a preseparator that separates an untreated gas region from a preseparator gas region, a main separator comprising a coalescing element for increasing the size of liquid droplets and a post-separator.

20 Claims, 6 Drawing Sheets

MULTI-STAGE APPARATUS FOR SEPARATING LIQUID DROPLETS FROM GASES

BACKGROUND OF THE INVENTION

The invention relates to a device for separating liquid droplets from gases, particularly an air deoiling element. Separators for liquid droplets from gases are used, for instance, to separate water and/or oil from air. Separators of this type are used particularly for deoiling the air in compressors.

A gas stream that comes into contact with liquids may pick up droplets of liquid. Liquid droplets may be entrained mechanically, e.g., as the gas flows through the liquid or is guided over a liquid. In rotary screw compressors, for example, air comes into contact with oil. The oil is used to aid sealing and to cool and lubricate the compressor. Liquid droplets can also be created in a gas stream through condensation. For example, condensation causes liquid droplets to form in a stream of steam. When compressed air is produced, temperatures can reach approximately 200° C. Because of these temperatures, a portion of the oil that is supplied to a rotary screw compressor, for example, evaporates. On subsequent cooling, the oil vapor condenses to droplets and mist. The oil droplets of a rotary screw compressor have a diameter on the order of magnitude of approximately 0.01 μm to 100 μm.

Droplet separators serve to separate liquid droplets from gases. Droplet separators are capable of separating a liquid phase from a gas phase. Droplet separators can be used to clean exhaust streams. With droplet separators, entrained liquid droplets can be separated from process gas streams. This separation can reduce corrosion or erosion of plant parts or caking or deposits on plant parts. Droplet separators are used, for example, to deoil compressed air.

Droplet separators can be configured as inertial separators. In inertial separators, the inertia of the droplets is used to separate the droplets on walls. Inertial separators are suitable particularly for larger droplets, typically having a diameter greater than approximately 20 μm. A simple form of a droplet separator is a baffle plate. In a baffle plate, a gas stream laden with liquid droplets is directed against a plate such that the gas stream changes its direction. Because of their inertia, the droplets contained in the gas stream maintain their direction, strike the plate and are discharged from there. Another type of inertial separation uses centrifugal forces. In centrifugal separators, the gas stream is guided along a curved path. The centrifugal forces cause the droplets to be guided onto an outer path with as large a radius of curvature as possible. Thus, the droplets are concentrated in this outer region. The droplets can then be separated on a wall, for example, along the outer region of the gas stream and can be discharged from that wall. As an alternative, gas with a low concentration of droplets can be removed only from the inner region of the gas stream. Various types of cyclones, for example, can be used as centrifugal separators.

Droplet separators can take the form of drainage elements. In a drainage element, a gas stream laden with liquid droplets is directed through a net-like and/or porous drainage structure. For example, a wire mesh or a nonwoven fabric, e.g., formed of a synthetic material or glass fibers may be used as the drainage structure. Droplets pass through the drainage structure more slowly than the gas stream. Due to gravity, the droplets move to the geodetically lower area of the drainage structure, where they collect and from where they can be discharged.

Inertial separation becomes more efficient the larger the droplets entrained in the gas stream are. To increase the size of the droplets, coalescing elements are used. In these coalescing elements, the gas stream is directed through a net-like and/or porous coalescing structure. This coalescing structure can be formed, for example, of a wire mesh or a nonwoven fabric of e.g., a synthetic material or glass fibers. The gas stream follows the flow lines. The droplets cannot follow the flow lines and adhere to the peripheral areas of the coalescing structure. A liquid film forms on the coalescing structure. Small droplets aggregate to larger droplets, i.e., they coalesce. The larger droplets leave the coalescing structure. Coalescing elements may also exhibit a drainage effect. In this case, the droplets form the liquid film on the coalescing structure, move to the geodetically lower area and can be discharged from there. Thus, a combined coalescing and drainage element may be formed. The larger and therefore heavier droplets exiting from the coalescing structure fall in the gas stream and can therefore also be removed from the gas stream.

Persons skilled in the art know various combinations of drainage and coalescing elements as well as inertial separators for separating liquids from gases, depending on the fields of application. The system described below is known for deoiling compressed air from compressors. In a pressure vessel, a cylindrical flow baffle is inserted at the upper end. The cylinder formed by the flow baffle is open at the bottom toward the interior of the pressure vessel. The compressed air flows in tangentially between the flow baffle and the pressure vessel wall, causing a preliminary separation of oil on the wall of the pressure vessel. The separated oil is returned to the compressor. The compressed air flows from below into the air deoiling element, which is located within the cylinder formed by the flow baffle. The air deoiling element comprises one or more coalescing and/or drainage stages, e.g., a coalescing structure of borosilicate glass fibers and a drainage structure of a nonwoven polyester fabric. The nonwoven fabric formed of borosilicate glass fibers and the nonwoven polyester fabric are each mounted onto a metal support member. Flow moves through the air deoiling element from the outside toward the inside. Small liquid droplets aggregate to larger droplets in the coalescing structure and in part already sink in the coalescing structure. Larger droplets exiting the coalescing structure sink further within the drainage structure and collect on the bottom of the air deoiling element. The oil on the bottom of the air deoiling element is returned to the compressor through a drainage line. The deoiled compressed air is transported from the pressure vessel into an accumulator.

A drawback in the described air deoiling system, which is used, for example, in rotary screw compressors, is that the pressure vessel must have a larger inside diameter than the air deoiling element so that the air can circulate around the air deoiling element. Thus, the pressure vessel must be manufactured in a larger size, which is more costly.

A further drawback is that air deoiling must be taken into account in the design of the pressure vessel. The inlet for the compressed air from the compressor must, for example, be tangential to obtain pre-separation. In addition, the pressure vessel in which the air deoiling element is installed is usually provided with a cylindrical baffle plate.

Conventional air deoiling elements have a one-piece construction. In case of replacement, the entire air deoiling element is replaced and a solid, heavy composite of metal, glass fiber and plastic as well as oil residues must be disposed of.

Because of the solid construction of the air deoiling element, a completely new air deoiling element must be designed, for example, when more coalescing surface is required to reduce the pressure loss across the coalescing stage. Different applications require completely different air deoiling elements to be produced.

SUMMARY OF THE INVENTION

Thus, it is an object of the invention to provide a device for separating liquids from gases that makes it possible to reduce the size of pressure vessels for deoiling the compressed air in air compressors.

A further object of the invention is to provide a device for separating liquids from gases, the construction of which makes air deoiling more independent of the construction of the pressure vessel.

A further object of the invention is to provide a device for separating liquids from gases, the construction of which makes it possible to reduce the material that has to be replaced during servicing.

A further object of the invention is to provide a device for separating liquids from gases, the construction of which makes it possible to implement different air deoiling elements for different applications by different combinations.

These and other objects are attained by a device for separating liquids from gases, comprising a preseparator, which separates an untreated gas region from a preseparator gas region, a main separator, including a coalescing element to increase the size of the liquid droplets, and a post-separator.

The integration of the preseparation stage into the device for separating liquids from gases eliminates the need for a cylindrical baffle plate in the pressure vessel with sufficient space between the baffle plate and the pressure vessel wall around the air deoiling element. The preseparation function is assumed by the device for separating liquids from gases. The device can receive flow from below, for example, and the pressure vessel can be essentially reduced to the diameter of the device. Since the preseparator separates the untreated gas region from a preseparator gas region, a maximum amount of the gas must pass through the preseparator before it can get to the main separator. Regardless of the position of the compressed air inlet into the pressure vessel, the air is therefore already partly deoiled by the preseparator before it gets to the main separator and is guided through the coalescing structure to the post-separator. A device of this type is particularly suitable for deoiling air, e.g., in air compressors, such as rotary screw compressors, or for removing water droplets from air.

In one embodiment, the device for separating liquids from gases has a modular construction composed of a preseperator and/or a main separator and/or a post-separator. This modular construction allows different elements to be combined for the preseparator, the main separator and the post-separator. The device can then be produced as a function of the application and the required performance data, such as oil separation rate or maximum throughput. The use of identical elements in different devices can reduce the production costs.

If the modular elements of the device for separating liquids from gases are detachably connected with each other, it is possible to replace just one component during servicing, for example. This reduces waste. A portion of the device can also be designed as a lifetime component.

In one embodiment, the preseparator is designed as a cyclone, preferably an inline cyclone or also more simply as a guide apparatus of an inline cyclone, e.g., also as an impeller. In an inline cyclone the flowing gas is guided by blades and thereby directed onto a curved path. Separation can occur in the form of impact separation on the blades or centrifugal separation on walls after the gas has passed through the blades. An inline cyclone is advantageous because from a production standpoint it can be easily produced in a single size, which reaches across the entire cross section of a pressure vessel. The inline cyclone can be formed by the walls of the pressure vessel in combination with a guide apparatus. An inline cyclone provides adequate preseparation; it is also low in weight. An inline cyclone, its guide apparatus or an impeller can be formed of synthetic resin material (i.e., plastic), for example, glass fiber-reinforced polyamide.

The coalescing element is preferably a coalescing structure mounted to a support member. A nonwoven borosilicate glass fiber fabric is preferred for the coalescing structure. The nonwoven glass fiber fabric is mounted to a support member formed of synthetic resin material, which provides the necessary compressive strength.

In one embodiment, a drainage element acting as a post-separator is located downstream of the coalescing element.

In yet another embodiment, an inertial separator acting as post-separator is located downstream of the coalescing element. A cyclone is preferred for this purpose. For the high post-separation rate required for air deoiling, an inverted cyclone is particularly preferred.

In yet another embodiment, the main separator is constructed of several components, e.g., several support tubes that can be assembled. This multi-component construction allows the main separator to be equipped with a different coalescing surface. The coalescing structure is mounted to the support tubes. The support tubes can be sealingly assembled so as to create a larger coalescing element. This makes it possible to construct a large coalescing element with a plurality of preferably identically shaped support tubes. As an alternative, a plurality of support tubes can also be mounted in a side-by-side parallel arrangement.

In yet another embodiment, the preseparator, the main separator and the post separator are installed in a pressure vessel. Preferably, the preseparator partitions the pressure vessel along a cross section. Such a partitioning makes optimal use of the volume of the pressure vessel.

In yet another embodiment, the device for separating liquids from gases is installed into the pressure vessel of an air compressor. The device is preferably used for a rotary screw compressor, in which the air is heavily laden with oil and the requirements call for oil-free compressed air.

The invention also relates to a method for separating liquids from gases, in which the gas flows through a preseparator, a coalescing element and a post separator. Such a method is particularly advantageous for deoiling air, especially in rotary screw compressors. The preseparator is preferably configured as a centrifugal separator, e.g., a cyclone, particularly an inline cyclone. The post separator can comprise a drainage element, or it can be configured as an inertial separator, e.g., a cyclone, particularly an inverted cyclone.

A modular construction of the device for separating liquids from gases offers particular flexibility. A kit may be offered in which the selection, e.g., in the case of the post separator, is between an inverted cyclone and a drainage element, for example, and/or, in the case of the preseparator, between an inline cyclone or the guide apparatus of an inline cyclone, e.g., an impeller, and/or in the case of the main separator between several or different support members. The kit can also include an inverted cyclone for the preseparator.

These and additional features of preferred embodiments of the invention are set forth not only in the claims, but also in the specification and drawings, and the individual features can be realized each by itself or together in the form of subcombinations in embodiments of the invention and in other fields of use, and may constitute advantageous, independently patentable embodiments, for which protection is hereby claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1A:
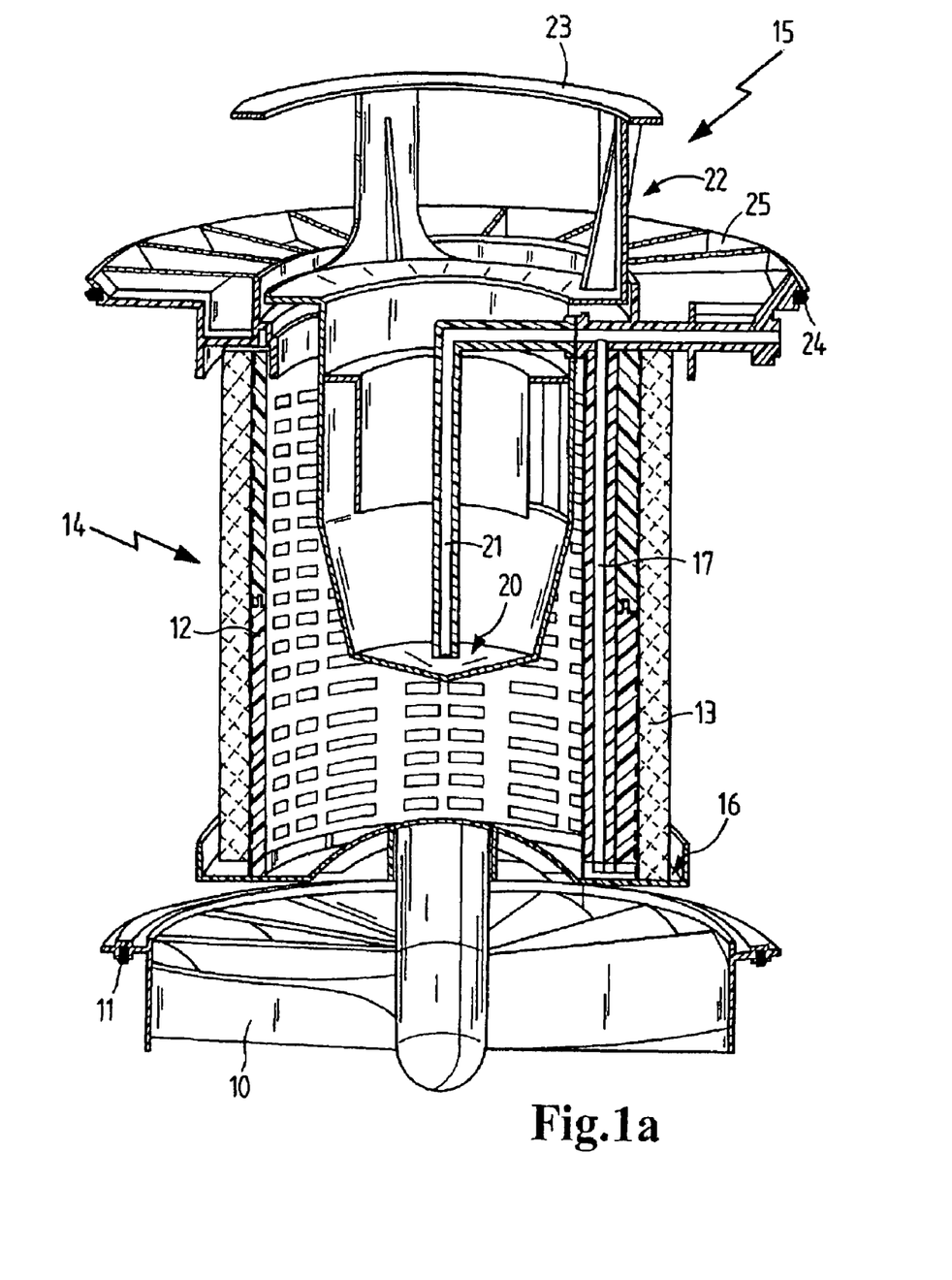
FIG. 1a shows a device for separating liquids from gases, which can be used for air deoiling in an air compressor system with a rotary screw compressor.
Figure 1B:
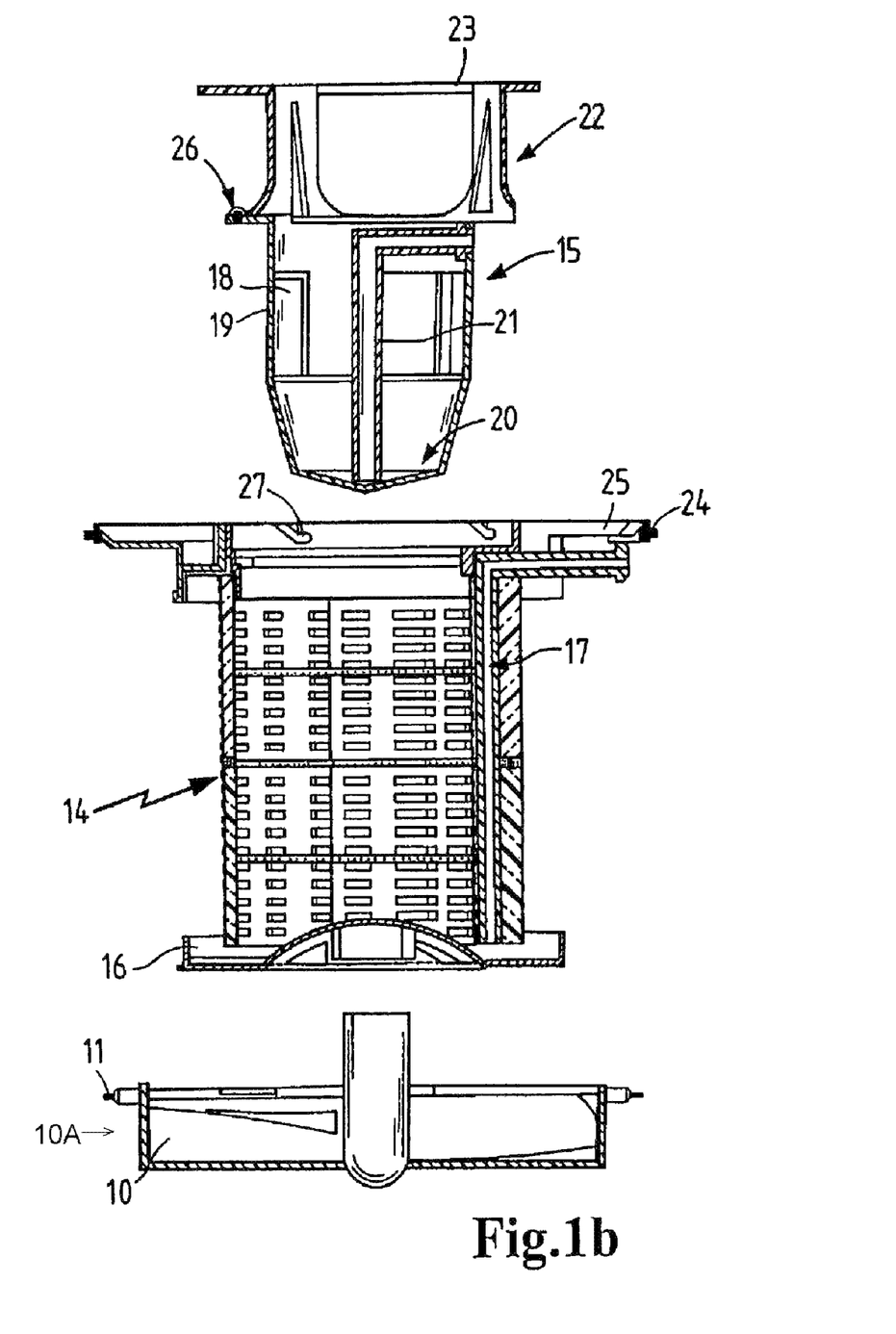
FIG. 1b depicts the device of FIG. 1a disassembled into several components in an exploded view.

In an air compressor system with a rotary screw compressor approximately 5 kg of oil are added for each $m^3$ of air during the production of compressed air. The oil is used to lubricate the compressor and to aid sealing. In a conventional air compressor system intended to generate so-called oil-free compressed air, i.e., compressed air with an oil content of approximately 1 to 3 $mg/m^3$ air, the oil-containing compressed air must be deoiled. In a conventional air compressor system a preliminary separation takes place in a pressure vessel. The preliminary separation is achieved in that the oil-containing air flows tangentially into the pressure vessel. The air flows around a cylindrical insert in the pressure vessel into which is inserted an air deoiling element to further separate the oil. The tangential entry and the separation of oil on the wall of the pressure vessel, which acts as a baffle plate, makes it possible to reduce the oil concentration in the compressed air arriving at the air deoiling element in the pressure vessel to approximately 2 to 5 $g/m^3$ of air. The separated oil is returned to the compressor. In the embodiment of the invention illustrated in FIGS. 1a and 1b, the oil-containing air can arbitrarily flow into the pressure vessel. In the pressure vessel the oil-containing air flows from below through the guide apparatus 10 of an inline cyclone used as a preseparator. The guide apparatus 10 can be sealed relative to the pressure vessel wall by a seal 11 to separate the pressure vessel into an untreated air region and a preseparator region. The seal 11 is configured in such a way that oil can run down the pressure vessel wall and flow through a narrow gap or openings on the seal out of the preseparator region back into the untreated air region. The gap or openings must be designed in such a way that a minimum amount of air penetrates through the gap or openings and the majority of the air from the untreated air region reaches the preseparator region through the preseparator. As an alternative, the oil can also flow back through the guide apparatus 10. The guide apparatus 10 together with the inner wall of the pressure vessel forms a kind of inline cyclone. A preseparator designed in this way can reduce the oil concentration to less than 0.5 $g/m^3$ air. The oil separated by the preseparator runs back into the oil sump in the geodetically lower region of the pressure vessel via the baffle plates and the pressure vessel wall. From there it can be returned to the compressor. The oil concentration, which is lower than that obtained by conventional air deoiling systems, provides a greater degree of freedom in the design of the main separator 14 and/or the post-separator 15 since these units have to achieve lower separation rates. From the preseparation area, the air flows through a main separator. In the embodiment illustrated in FIG. 1a the main separator is a coalescing structure in the form of a non-woven borosilicate glass fiber fabric 13, which is applied to a support tube 12 in a plurality of layers. As the gas flows through the non-woven fabric 13, smaller droplets aggregate to larger droplets. At the same time the droplets sink within the coalescing structure. The sinking droplets collect in a first trough 16 together with large droplets that come out of the coalescing structure and fall geodetically downward in the gas stream in the interior of the support tube 12. The separated oil is returned from the trough 16 through a first drainage line 17. The air stream flowing from the main separator 14 to the post-separator 15 now essentially contains larger oil droplets that can be separated in the post-separator 15. In the embodiment depicted in FIGS. 1a and 1b, an inverted cyclone 18 is used for post-separation. In the inverted cyclone the air is set into rotation, so that the oil droplets are separated on the wall 19 of the inverted cyclone 18. The oil droplets slide along the wall 19 of the inverted cyclone 18 into the second trough 20, from where they are returned to the compressor through a second drainage line 21. The second drainage line 21 in the embodiment illustrated in FIGS. 1a and 1b is coupled to the first drainage line 17, but could also extend separately. The post-separator 15 comprises a spacer 22 having a mounting ring attached to its upper end. The device for separating liquids from gases can be fixed in the pressure vessel by means of this mounting ring 23. A separation plate 25 disposed at the upper end of the main separator 14 provides a seal against the pressure vessel with gasket 24. The separation plate 25 separates the preseparator gas region from the deoiled air exiting the post-separator 15.

FIG. 1b illustrates the modular construction of the device for separating liquids from gases. The pre-separator 10A is configured as an inline cyclone 10, the main separator 14 and the post separator 15 are modular components. The modules can be assembled using a bayonet joint, for example. Pins 26 and recesses 27 for the pins 26 for coupling the post-separator 15 to the main separator 14 are shown. Other mating, latching or screwed connections are of course also feasible. The modules may also be welded together. All the individual modules of FIG. 1b can be formed of synthetic resin material, particularly a glass fiber-reinforced polyamide. The required seals 11, 26 or additional seals can be injection molded or inserted into grooves as O-rings. The modular construction makes it possible to interchange different elements for a given module. For example, a spiral cyclone and a second inline cyclone may be used instead of the inverted cyclone 18. Main separators of different heights and with differently sized surfaces of the coalescing structure may be used. If the preseparator, main separator and post-separator modules are detachably coupled together, it is also possible to replace only one module during servicing. For example, the inline cyclone 10 and the post-separator 15 could be lifetime components so that only the main separator 14 with the nonwoven fabric 13 would have to be replaced.

Figure 2:
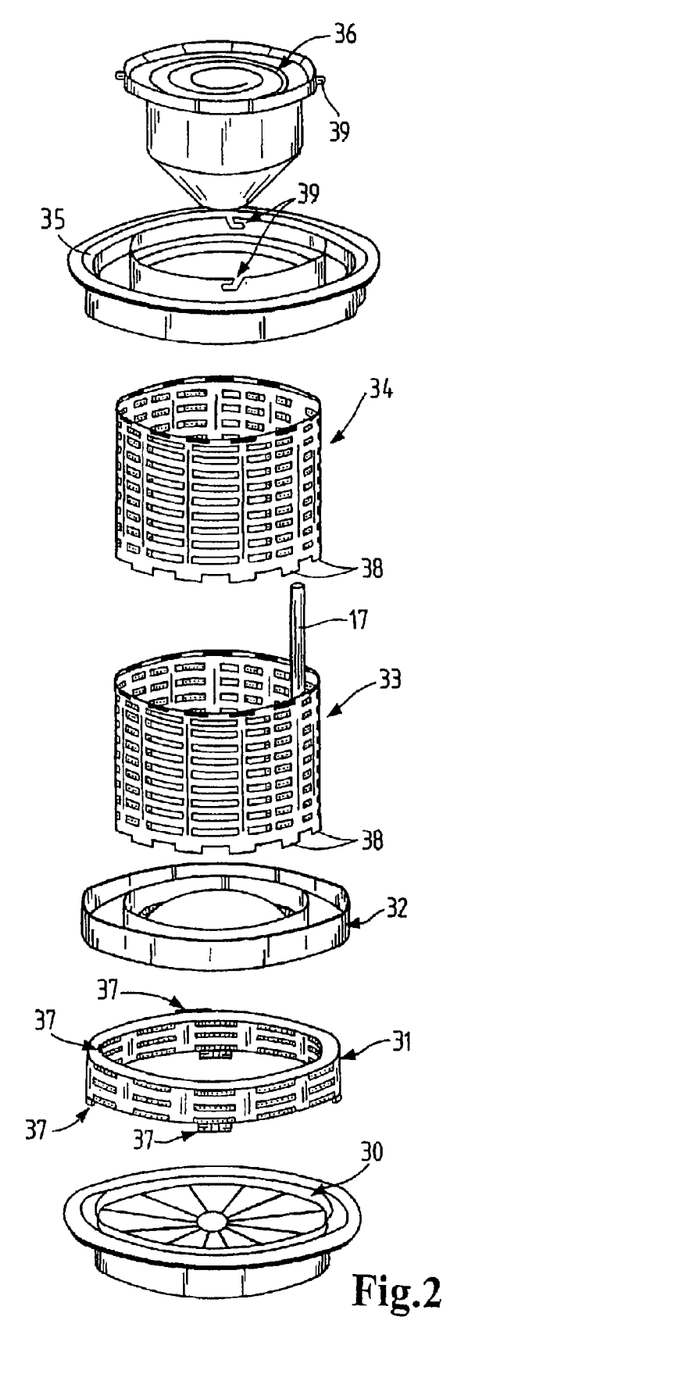
FIG. 2 shows an alternative device for separating liquids from gases, which can be used for air deoiling in an air compressor system with a rotary screw compressor having a main separator that can be assembled from a plurality of support tubes.

FIG. 2 is an exploded view of the components of an embodiment of the device for separating liquids from gases with a main separator assembled from a plurality of support tubes. In the embodiment of FIG. 2, an inline cyclone 30 is used as a preseparator. The inline cyclone 30 can be detachably connected to an oil collection trough 32 via a spacer 31 with latching connections 37. The oil collection trough 32 can be coupled to a first support tube 33 by mating connections 38. A second support tube 34 constructed identically to the first support tube 33 can be fixed to the first support tube 33 by means of mating connections 38. Additional support tubes, which are not depicted, can be added. In the schematic representation of FIG. 2, the non-woven fabric surrounding the support tube is not depicted. The end closure element 35 can in turn be connected to the second support tube 34 by a mating connection. A spiral cyclone 36 acting as a post-separator may be inserted into the end closure element 35. In the embodiment shown in FIG. 2, the spiral cyclone 36 is detachably mounted to the end closure element 35 by means of a bayonet joint 39. As an alternative to a support tube extended by a plurality of support tubes 33, 34, a plurality of parallel support tubes may also be used.

Figure 3A:
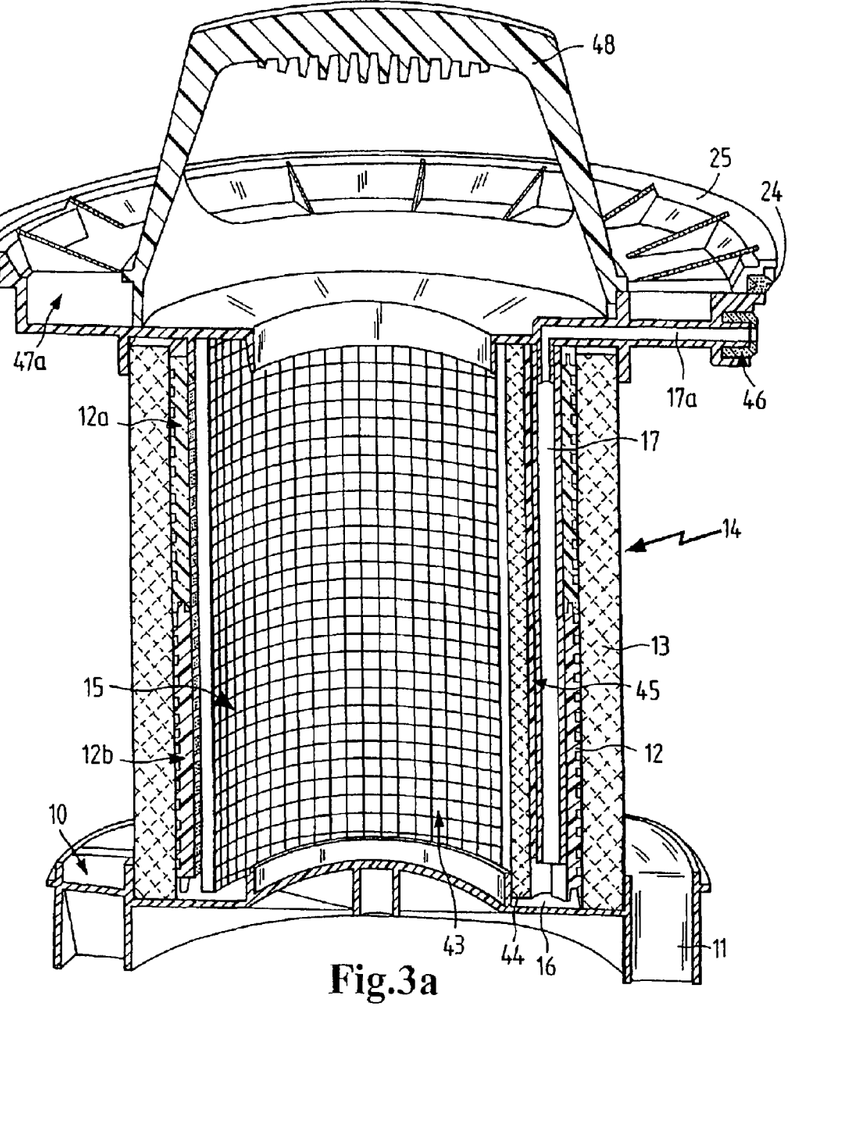
FIGS. 3a and 3b show another preferred embodiment of an air deoiling element according to the invention.

The air deoiling element of FIG. 3a is a preferred embodiment of the invention. An impeller 10 formed of synthetic resin material, e.g., a glass fiber-reinforced polyamide, is used as the preseparator. On the one hand, the impeller 10 acts as an inertial separator, similar to a baffle plate. On the other hand, the impeller 10 causes the air stream to be guided onto a curved path and thus the oil to be separated on the inner wall of the pressure vessel. The main separator 14 is configured as a coalescing element as illustrated in FIGS. 1a and 1b. A nonwoven fabric 13 is wound onto and glued together with a first support member 12. The first support member 12 is composed of two modules 12a and 12b. These two modules 12a and 12b can be identical. In the embodiment of FIG. 3 the post-separator 15 is configured as a drainage element. A nonwoven drainage material 44, e.g., formed of polyamide or glass fiber, is wound around a second support member 43. Oil separated by the main separator 14 and the post-separator 15 collects in a trough 16. A seat 45 for a drainage line 17 is mounted to the first support tube 12. The seat 45 is configured as a tubular segment that is injection-molded onto each module 12a and 12b of the support member 12. The drainage line 17 is inserted into the seat 45. The drainage line 17 is connected to a drainage line segment 17a. As the air deoiling element is installed in the pressure vessel with a seal 46, this drainage line segment 17a is coupled to a pressure vessel outlet. At the geodetically upper end the first support member 12 and the second support member 43 are connected to an end disk, which acts as a partition plate 25 partitioning the pressure vessel. The partition plate 25 forms a seal relative to the pressure vessel by means of a sealing ring 24. A handle 48 is mounted to the partition plate 25. This handle can be removable or, in another embodiment of the invention, it can fix the air deoiling element within the pressure vessel in the installed state of the air deoiling element. The conically formed positioning marker 47a can be inserted into a correspondingly formed counterpart on the pressure vessel. The conical form of the positioning marker 47a makes it self-locating, so that the air deoiling element, if not quite correctly positioned, slides automatically into the correct position during installation. The positioning marker 47a can also be configured in such a way that it creates a clamping effect in the air deoiling element, thereby causing the seal 46 to be axially clamped.

Figure 3B:
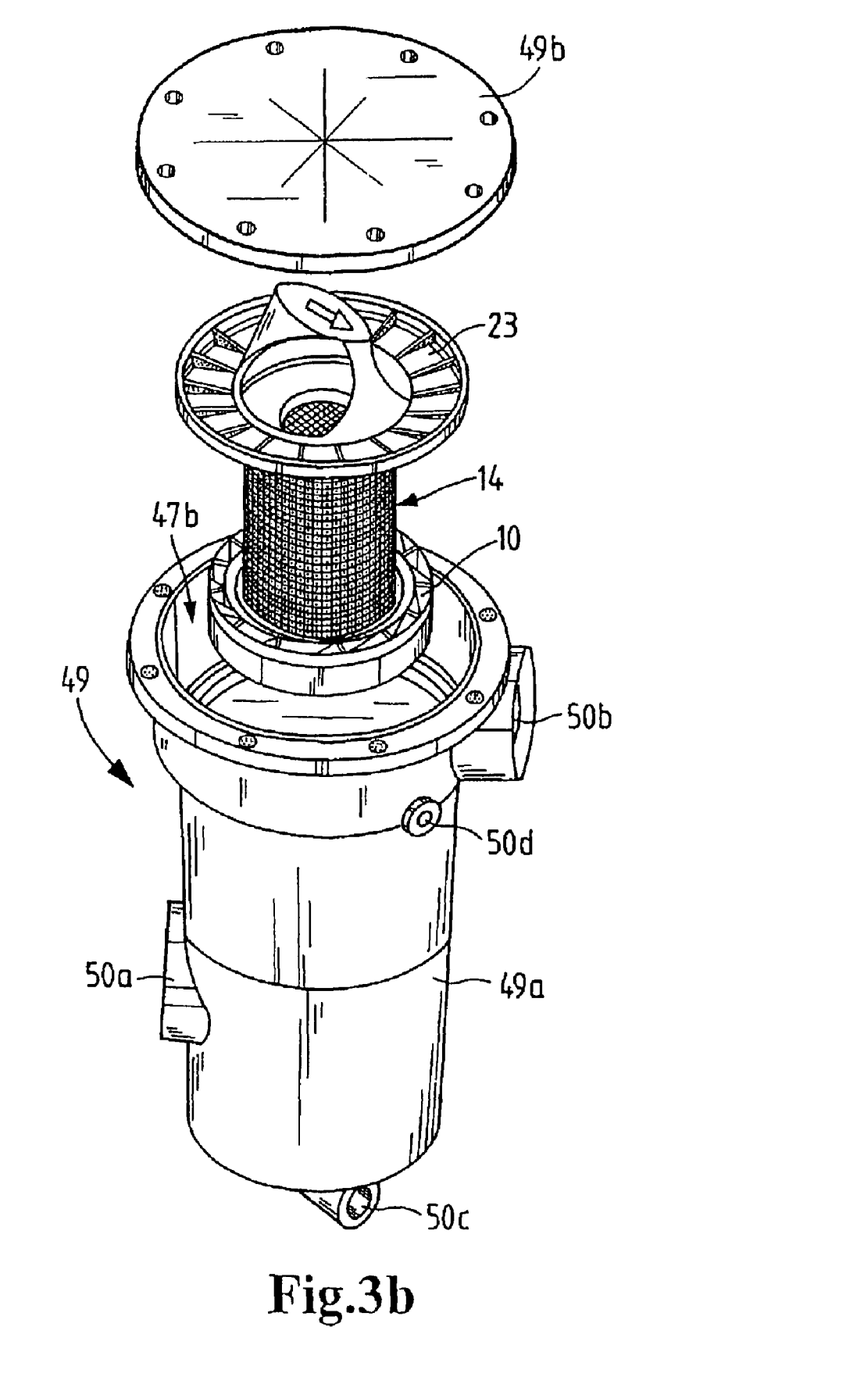

FIG. 3b illustrates the installation of the air deoiling element shown in FIG. 3a in a pressure vessel 49. The pressure vessel 49 comprises a cover 49b and a body 49a. The pressure vessel is preferably made of steel, e.g., a special high-grade steel. The pressure vessel 49 comprises air inlets 50a and air outlets 50b. The pressure vessel comprises an oil outlet at its geodetically lower end, and an additional oil outlet 50d, which couples to the drainage line 17. A recess 47b on the pressure vessel 49 corresponding to a positioning marker 47a allows the air deoiling element to be installed in only one position. The air deoiling element can be inserted into the pressure vessel 49a and the cover 49b screwed onto the body 49a without requiring lines on the pressure vessel 49 to be opened for this purpose.

Figure 4:
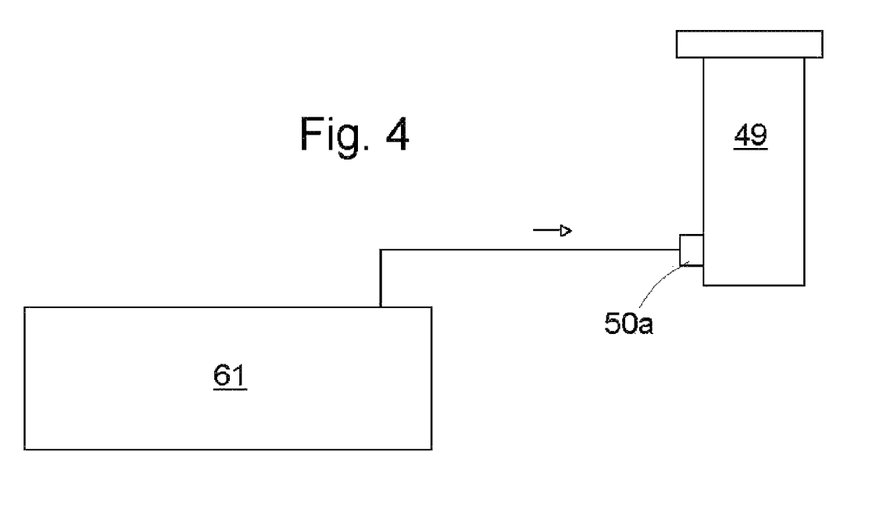
FIG. 4 schematically depicts compressed gas flow from the compressed air discharge of a rotary screw compressor to an inlet of the preseparator of a multi-stage device for separating liquids from gases, consistent with the present invention.

FIG. 4 schematically depicts compressed gas flow from the compressed air discharge of a rotary screw compressor 61 to an inlet of the preseparator (inline cyclone 10) through the air inlet 50a of the pressure vessel 49. Refer also to FIG. 3b where the preseparator (Inline cyclone 10) is positioned for installation in the pressure vessel 49 for flow communication with the air inlet port 50a of the pressure vessel 49.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air deoiling device coalescing and separating entrained liquids from a gaseous air stream, comprising:
 a modular air deoiling element of detachably mated components, said mated components being removably inserted together as a unit into a pressure vessel, said detachably mated components including
  i) a preseparator separating a portion of said entrained liquids from said gaseous stream, said preseparator separating an untreated gas region from a preseparator gas region;
  ii) a main separator comprising
   a coalescing element aggregating liquid droplets in said gaseous stream into larger liquid droplets;
   a drainage line arranged in said main separator and operable to remove separated liquid; and
  iii) a post-separator separating said larger droplets from said gaseous stream;
 wherein said detachably mated modular components are selected and combined to customize the air deoiling element as a function of application and required performance data wherein the preseparator comprises a baffle plate, a guide apparatus or a centrifugal separator selected from the group consisting of a cyclone and an impeller.

2. The device as claimed in claim 1, wherein the preseparator is formed of synthetic resin material.

3. The device as claimed in claim 1, wherein the preseparator functions independently of an inflow direction to the preseparator.

4. The device as claimed in claim 1, wherein the liquid is oil or water, and the gas is air.

5. The device as claimed in claim 1, wherein the detachably mated components are selected and combined to customize the air deoiling element to remove water or oil droplets from compressed air of a compressed air outlet of a rotary screw compressor.

6. The device as claimed in claim 1, wherein the device is modularly constructed of a preseparator, a main separator and a post-separator.

7. The device as claimed in claim 6, wherein the preseparator is detachably connected to the main separator, or the main separator is detachably connected to the post-separator, or the preseparator is detachably connected to the main separator, and the main separator is detachably connected to the post-separator.

8. The device as claimed in claim 1, wherein the coalescing element comprises a coalescing structure mounted around a support tube.

9. The device as claimed in claim 1, wherein the post-separator comprises a drainage element, said drainage element comprising a net-like or porous drainage structure operable to pass said entrained liquid droplets more slowly than said gaseous stream, said drainage element collecting said droplets by gravity.

10. The device as claimed in claim 1, wherein the post separator comprises an inertial separator.

11. The device as claimed in claim 10, wherein the inertial separator is an inverted cyclone.

12. The device as claimed in claim 7, wherein the main separator is constructed of a plurality of modular components.

13. The device as claimed in claim 12, wherein the plurality of modular components comprises a plurality of support tubes engaged axially end to end.

14. The device as claimed in claim 13, wherein the plurality of support tubes supports said coalescing element, said coalescing element arranged radially on and mounted to said support tubes.

15. The device as claimed in claim 1, further comprising a pressure vessel into which the preseparator, the main separator and the post-separator are installed.

16. The device as claimed in 15, wherein the preseparator partitions the pressure vessel.

17. Air compressor system comprising a device for separating liquids from gases as claimed in claim 1.

18. A kit for assembling a device of claim 1 for separating liquids from gases, comprising:
   i) a preseparator;
   ii) a main separator with a coalescing element; and
   iii) a post-separator selected from the group consisting of a drainage element and an inertial separator wherein the preseparator is selected from the group consisting of an impeller, a guide apparatus, an inline cyclone, and an inverted cyclone.

19. A kit as claimed in claim 18, wherein the preseparator, the main separator and the post-separator can be detachably assembled.

20. A kit as claimed in claim 18, wherein the main separator can be assembled from a plurality of center tube parts.

* * * * *